(12) United States Patent
Seo et al.

(10) Patent No.: US 10,980,016 B2
(45) Date of Patent: Apr. 13, 2021

(54) METHOD FOR TRANSMITTING OR RECEIVING DOWNLINK CONTROL INFORMATION IN WIRELESS COMMUNICATION SYSTEM AND APPARATUS FOR SAME

(71) Applicant: LG ELECTRONICS INC., Seoul (KR)

(72) Inventors: Inkwon Seo, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/476,031

(22) PCT Filed: Jan. 3, 2018

(86) PCT No.: PCT/KR2018/000082
§ 371 (c)(1),
(2) Date: Jul. 3, 2019

(87) PCT Pub. No.: WO2018/128366
PCT Pub. Date: Jul. 12, 2018

(65) Prior Publication Data
US 2019/0349907 A1    Nov. 14, 2019

Related U.S. Application Data

(60) Provisional application No. 62/442,943, filed on Jan. 5, 2017, provisional application No. 62/445,761, filed on Jan. 13, 2017.

(51) Int. Cl.
*H04W 72/04* (2009.01)
*H04L 5/00* (2006.01)

(52) U.S. Cl.
CPC ......... *H04W 72/042* (2013.01); *H04L 5/0007* (2013.01); *H04L 5/0048* (2013.01)

(58) Field of Classification Search
CPC ... H04L 5/0053; H04L 5/0048; H04L 5/0007; H04W 72/042; H04W 72/1278; H04W 72/1298
See application file for complete search history.

(56) References Cited

U.S. PATENT DOCUMENTS

2010/0254268 A1* 10/2010 Kim .................. H04L 5/001
                                                    370/241
2011/0044391 A1    2/2011  Ji et al.
(Continued)

OTHER PUBLICATIONS

PCT International Application No. PCT/KR2018/000082, Written Opinion of the International Searching Authority dated Apr. 9, 2018, 16 pages.
(Continued)

*Primary Examiner* — Christopher M Crutchfield
(74) *Attorney, Agent, or Firm* — Lee Hong Degerman Kang Waimey

(57) ABSTRACT

A method for receiving downlink control information by a terminal in a wireless communication system may include receiving control channel element (CCE) configuration information from a base station; determining multiple control channel candidates, each of which has one or more CCEs, on the basis of the CCE configuration information; and blind-detecting downlink control information through the multiple control channel candidates, wherein: each of the one or more CCEs includes multiple resource element groups (REGs), and the number of data resource elements (REs) for carrying the downlink control information is independently determined for each REG; and the CCE configuration information indicates whether each CCE has a fixed number of REGs or a fixed number of data REs. The (Continued)

UE is capable of communicating with at least one of another UE, a UE related to an autonomous driving vehicle, a base station or a network.

12 Claims, 14 Drawing Sheets

(56) References Cited

U.S. PATENT DOCUMENTS

| | | | |
|---|---|---|---|
| 2011/0096745 A1 | 4/2011 | Ahn et al. | |
| 2013/0194931 A1* | 8/2013 | Lee | H04L 5/0053 370/241 |
| 2013/0242824 A1 | 9/2013 | Lee et al. | |
| 2014/0056279 A1* | 2/2014 | Chen | H04L 5/0032 370/330 |
| 2014/0126487 A1* | 5/2014 | Chen | H04L 1/0041 370/329 |
| 2016/0302174 A1* | 10/2016 | Chatterjee | H04W 72/06 |
| 2018/0167915 A1* | 6/2018 | Lee | H04W 12/06 |

OTHER PUBLICATIONS

Zte, et al., "WF on CCE for NR DL Control", 3GPP TSG RAN WG1 Meeting #87, R1-1613091, Nov. 2016, 5 pages.
LG Elecrtonics, et al., "WF on sREG and sCCE structure", 3GPP TSG RAN WG1 Meeting #87, R1-1613409, Nov. 2016, 2 pages.

* cited by examiner

FIG. 11
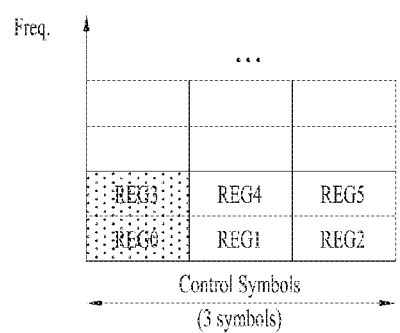
(a)
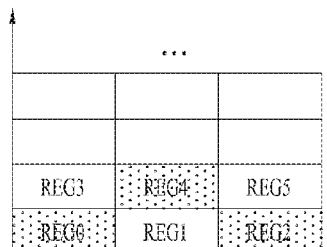
(b)
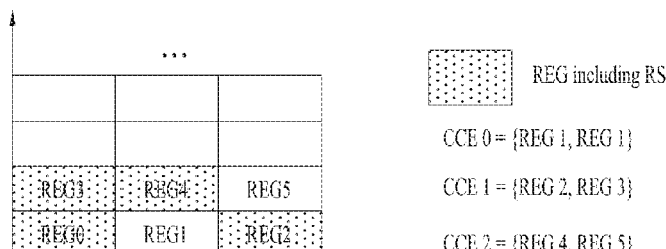
(c)

METHOD FOR TRANSMITTING OR RECEIVING DOWNLINK CONTROL INFORMATION IN WIRELESS COMMUNICATION SYSTEM AND APPARATUS FOR SAME

CROSS-REFERENCE TO RELATED APPLICATIONS

This application is the National Stage filing under 35 U.S.C. 371 of International Application No. PCT/KR2018/000082, filed on Jan. 3, 2018, which claims the benefit of U.S. Provisional Application No. 62/442,943, filed on Jan. 5, 2017, and 62/445,761, filed on Jan. 13, 2017, the contents of which are hereby incorporated by reference herein in their entirety.

TECHNICAL FIELD

The present invention relates to a wireless communication system, and more particularly, to a method for transmitting and receiving downlink control information based on a blind detection technique, and a device therefor.

BACKGROUND ART

As more communication devices require greater communication capacity, the need of mobile broadband communication more enhanced than the conventional RAT (radio access technology) has been issued in a next generation communication system discussed recently. Also, massive MTC (Machine Type Communications) technology that provides various services anywhere and at any time by connecting a plurality of devices and things is one of main issues which will be considered in next generation communication. Furthermore, considering service/user equipment (UE) susceptible to latency and reliability, Ultra-Reliable and Low Latency Communication (URLLC) has been discussed in a next generation communication system.

As described above, a new RAT considering eMBB, mMTC and URLCC has been discussed for next generation wireless communication.

DETAILED DESCRIPTION OF THE INVENTION

Technical Problems

An object of the present invention devised to solve the problem lies on a method and apparatus for efficiently transmitting or receiving downlink control information in a wireless communication system.

The technical objects of the present invention are not limited to the aforementioned objects, and other technical objects not described herein will be understood from the embodiments of the present invention.

Technical Solutions

According to an aspect of the present invention, provided herein is a method of receiving downlink control information by a user equipment (UE) in a wireless communication system, including receiving control channel element (CCE) configuration information from a base station (BS); determining a plurality of control channel candidates each including one, two, or more CCEs, based on the CCE configuration information; and blind-detecting downlink control information through the plural control channel candidates. Each of the one, two, or more CCEs may include a plurality of resource element groups (REGs) and the number of resource elements (REs) for carrying the downlink control information may be independently determined per REG. The CCE configuration information may indicate whether each CCE has a fixed number of REGs or a fixed number of data REs.

In another aspect of the present invention, provided herein is a user equipment (UE) for receiving downlink control information in a wireless communication system, including a receiver configured to receive control channel element (CCE) configuration information from a base station (BS); and a processor configured to determine a plurality of control channel candidates each including one, two, or more CCEs, based on the CCE configuration information, and blind-detect downlink control information through the plural control channel candidates. Each of the one, two, or more CCEs may include a plurality of resource element groups (REGs) and the number of resource elements (REs) for carrying the downlink control information may be independently determined per REG. The CCE configuration information may indicate whether each CCE has a fixed number of REGs or a fixed number of data REs.

In another aspect of the present invention, provided herein is a method of transmitting downlink control information by a base station (BS) in a wireless communication system, including transmitting control channel element (CCE) configuration information to a user equipment (UE); and transmitting downlink control information through any one of a plurality of control channel candidates each including one, two, or more CCEs to the UE. Each of the one, two, or more CCEs may include a plurality of resource element groups (REGs) and the number of resource elements (REs) for carrying the downlink control information may be independently determined per REG. The CCE configuration information may indicate whether each CCE has a fixed number of REGs or a fixed number of data REs.

If each CCE includes the fixed number of data REs, a first control channel candidate and a second control channel candidate, corresponding to the same aggregation level, may be permitted to have different numbers of REGs. For example, if each CCE includes 40 data REs and an aggregation level is 1, one CCE may correspond to 4 or 5 REGs according to the number of REs for carrying a reference signal.

If each CCE has the fixed number of REGs, the number of data REs may be individually determined per CCE.

The number of orthogonal frequency division multiplexing (OFDM) symbols corresponding to each REG and the number of reference signal REs included in each REG may be independently configured per physical resource block (PRB) set.

At least one of the size of one CCE and a minimum aggregation level may be determined according to the size of the downlink control information that the UE is to detect.

Advantageous Effects

According to an embodiment of the present invention, a control channel element (CCE) may be adaptively configured to suit a wireless channel environment by defining the CCE based on network signaling and ambiguity generated in specifying a CCE resource in an environment in which the number of resource elements available for downlink transmission in each resource element group (REG) is not fixed may be solved.

The effects that can be achieved with the present invention are not limited to what has been particularly described hereinabove and other advantages not described herein will be more clearly understood from the following detailed description of the present invention.

DESCRIPTION OF DRAWINGS

FIG. 11 illustrates RS mapping schemes according to an embodiment of the present invention.

BEST MODE FOR CARRYING OUT THE INVENTION

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP based mobile communication system, but the technical idea of the present invention is not limited thereto. Specific terms used in the following description are provided to provide further understanding of the present invention and use of the terms may be modified to other forms within the scope of the present invention.

Prior to discussion of the New RAT, the 3GPP LTE/LTE-A system will briefly be described. The following description of 3GPP LTE/LTE-A may be referenced to help understanding of New RAT, and some LTE/LTE-A operations and configurations that do not conflict with the design of New RAT may also be applied to New RAT. New RAT may be referred to as 5G mobile communication for convenience.

3GPP LTE/LTE-A System

Figure 1:
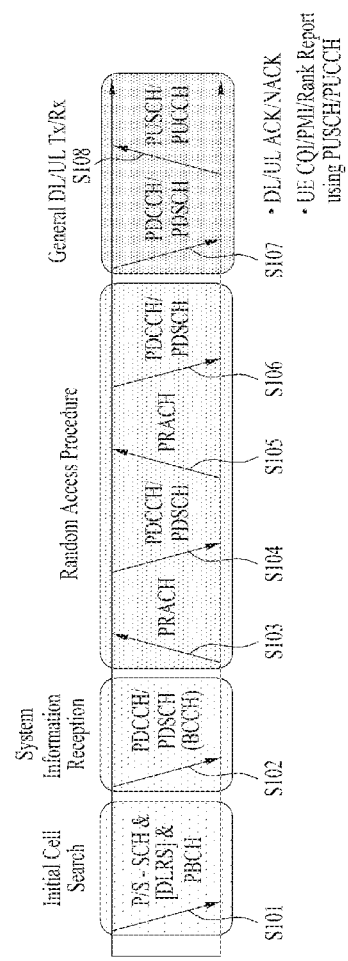
FIG. 1 is a diagram illustrating physical channels used for 3GPP LTE/LTE-A system and a general signal transmission method using the same.

FIG. 1 is a diagram illustrating physical channels used for 3GPP LTE/LTE-A system and a general signal transmission method using the same.

Referring to FIG. 1, if power of a user equipment (UE) is turned on or the UE enters a new cell, the UE may perform an initial cell search operation for matching synchronization with a base station (BS) and the like in operation S101. To this end, the UE may receive a primary synchronization channel (P-SCH) and a secondary synchronization channel (S-SCH) from the BS, may match synchronization with the BS and may then obtain information such as a cell ID and the like. Subsequently, the UE may receive a physical broadcast channel (PBCH) from the BS and may be then able to obtain intra-cell broadcast information. Meanwhile, the UE may receive a downlink reference signal (DL RS) and may be then able to check a DL channel state.

Upon completing the initial cell search, the UE may receive a physical downlink control channel (PDCCH) and a physical downlink shared control channel (PDSCH) according to the physical downlink control channel (PDCCH) in operation S102, thereby obtaining a detailed system information.

Thereafter, the UE may perform a random access procedure to complete access to the BS as in operations S103 to S106. To this end, the UE may transmit a preamble via a physical random access channel (PRACH) (S103) and may then receive a response message on PDCCH and a corresponding PDSCH in response to the preamble (S104). In case of contention-based random access, it may perform a contention resolution procedure such as a transmission (S105) of an additional physical random access channel and a channel reception (S106) of a physical downlink control channel and a corresponding physical downlink shared channel.

Upon performing the above-mentioned procedures, the UE may perform a PDCCH/PDSCH reception (S107) and a PUSCH/PUCCH (physical uplink shared channel/physical uplink control channel) transmission (S108) as a general uplink/downlink signal transmission procedure. Control information transmitted to a BS by a UE may be commonly named uplink control information (hereinafter abbreviated UCI). The UCI may include Hybrid Automatic Repeat and reQuest Acknowledgement/Negative-ACK (HARQ-ACK/NACK), Scheduling Request (SR), Channel Quality Indication (CQI), Precoding Matrix Indication (PMI), Rank Indication (RI) and the like. In the present specification, the HARQ-ACK/NACK is simply called HARQ-ACK or ACK (NACK) (A/N). The HARQ-ACK includes at least one of a positive ACK (simply, ACK), a negative ACK (NACK), DTX, and NACK/DTX. The UCI is normally transmitted on PUCCH. Yet, when both control information and traffic data need to be simultaneously transmitted, the UCI may be transmitted on PUSCH. Moreover, the UCI may be non-periodically transmitted in response to a request/indication made by a network.

Figure 2:
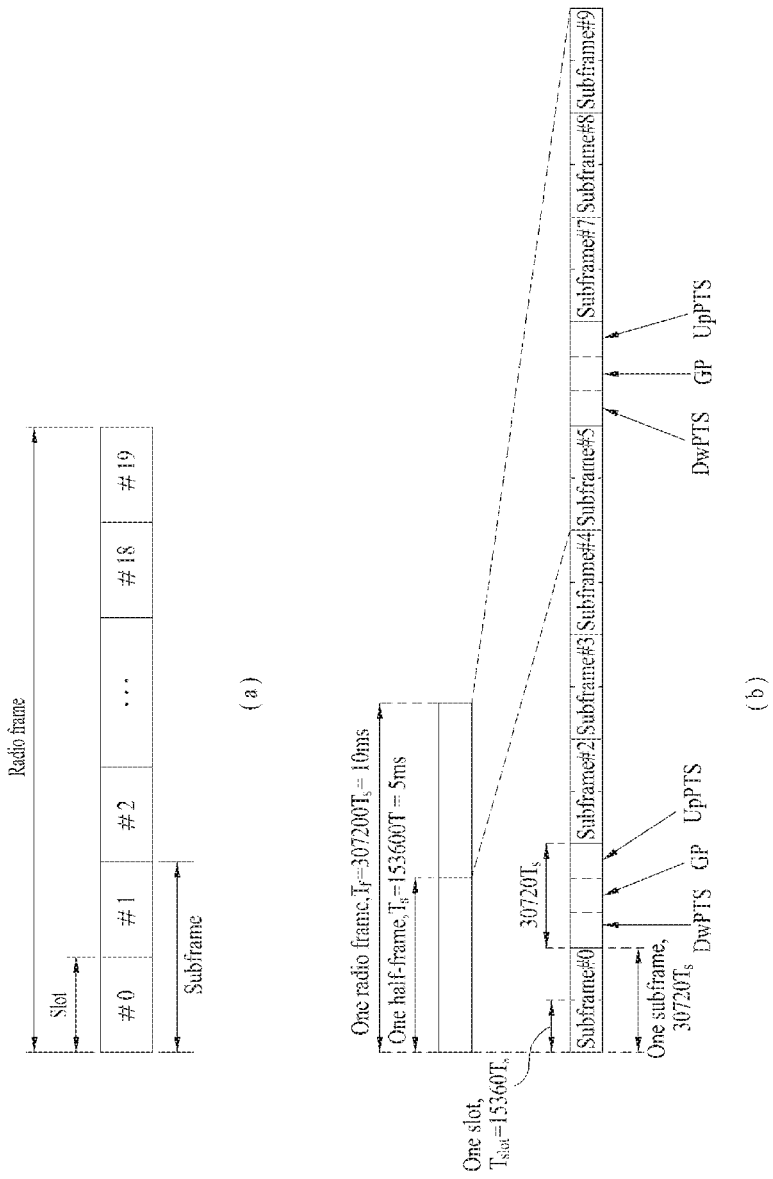
FIG. 2 is a diagram illustrating a structure of a radio frame for 3GPP LTE/LTE-A system.

FIG. 2 is a diagram illustrating a structure of a radio frame. Referring to FIG. 2, UL/DL (uplink/downlink) data packet transmission is performed in a unit of subframe in a cellular OFDM radio packet communication system. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 2(a) is a diagram for a structure of a type 1 radio frame. A DL (downlink) radio frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDM in downlink, OFDM symbol is provided to indicate one symbol period. The OFDM symbol may be named SC-FDMA symbol or symbol period. Resource block (RB) may include a plurality of contiguous subcarriers in one slot.

The number of OFDM symbols included in one slot may vary according to a configuration of Cyclic Prefix (CP). The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may use the extended CP to further reduce the inter-symbol interference.

When a normal CP is used, since one slot includes 7 OFDM symbols, one subframe includes 14 OFDM symbols. In this case, first maximum 3 OFDM symbols of each subframe may be allocated to PDCCH (physical downlink control channel), while the rest of the OFDM symbols are allocated to PDSCH (physical downlink shared channel).

FIG. 2(b) is a diagram for an example of a structure of a type 2 radio frame. The type-2 radio frame includes 2 half frames. Each of the half frames includes 5 subframes, DwPTS (downlink pilot time slot), GP (guard period) and UpPTS (uplink pilot time slot) and one subframe consists of two slots. The DwPTS is used for initial cell search, synchronization or channel estimation in a UE. The UpPTS is used for channel estimation in a BS and uplink transmission synchronization of a UE. The guard period is a period for eliminating interference generated in uplink due to multipath delay of a downlink signal between uplink and downlink.

The above-described structures of the radio frame are exemplary only. And, the number of subframes included in a radio frame, the number of slots included in the subframe and the number of symbols included in the slot may be modified in various ways.

Figure 3:
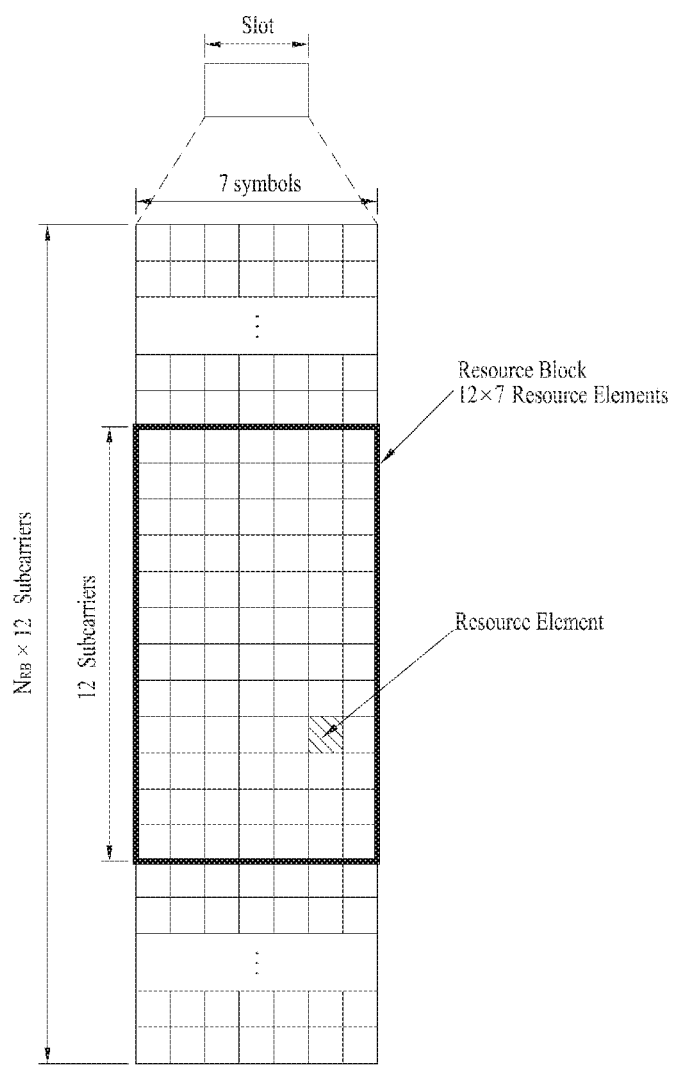
FIG. 3 is a diagram illustrating a resource grid for a downlink slot for 3GPP LTE/LTE-A system.

FIG. 3 is a diagram illustrating a resource grid for a downlink slot.

Referring to FIG. 3, one downlink (DL) slot may include a plurality of OFDM symbols in time domain. In particular, one DL slot exemplarily includes 7(6) OFDM symbols and one resource block (RB) includes 12 subcarriers in frequency domain. Each element on a resource grid is called a resource element (hereinafter abbreviated RE). One resource block includes 12×7(6) resource elements. The number $N_{RB}$ of resource blocks included in a DL slot may depend on a DL transmission bandwidth. And, the structure of an uplink (UL) slot may be identical to that of the DL slot and OFDM symbol is replaced by SC-FDMA symbol.

Figure 4:
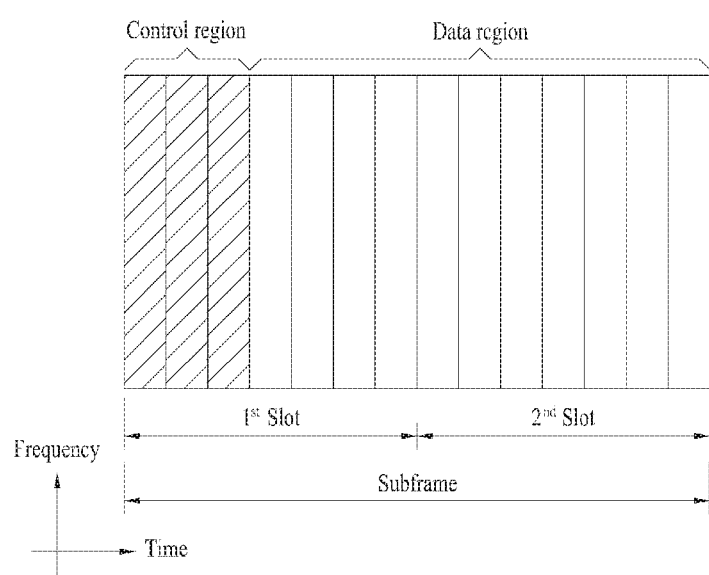
FIG. 4 is a diagram illustrating a structure of a downlink subframe for 3GPP LTE/LTE-A system.

FIG. 4 is a diagram illustrating a structure of a downlink subframe.

Referring to FIG. 4, maximum 3 (4) OFDM symbols situated at a fore part of a first slot of one subframe correspond to a control region to which control channels are allocated. The rest of OFDM symbols correspond to a data region to which PDSCH (physical downlink shared channel) is allocated. PDSCH is used for carrying a transport block (hereinafter abbreviated TB) or a codeword (hereinafter abbreviated CW) corresponding to the TB. The TB means a data block delivered from a MAC (medium access control) layer to a PHY (physical) layer on a transport channel. The CW corresponds to a coded version of the TB. Correlation between the TB and the CW may vary depending on a swapping. In the present specification, PDSCH, a TB, and a CW are used in a manner of being mixed. Examples of DL control channels used by LTE (-A) may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and carries information on the number of OFDM symbols used for a transmission of a control channel within the subframe. The PHICH carries a HARQ-ACK (hybrid automatic repeat and request acknowledgement) signal in response to an UL transmission. The HARQ-ACK response includes a positive ACK (simply, ACK), a negative ACK (NACK), DTX (discontinuous transmission), or NACK/DTX. In this case, HARQ-ACK, HARQ ACK/NACK, and ACK/NACK are used in a manner of being mixed.

Control information carried on PDCCH may be called downlink control information (hereinafter abbreviated DCI). The DCI includes resource allocation information for a UE or a UE group and different control information. For instance, the DCI includes UL/DL scheduling information, UL transmit (Tx) power control command, and the like.

Figure 5:
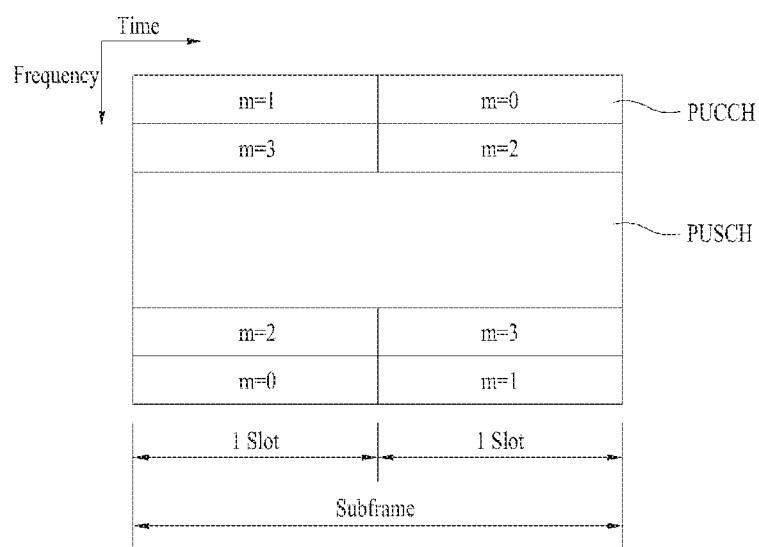
FIG. 5 is a diagram illustrating a structure of an uplink subframe for 3GPP LTE/LTE-A system.

FIG. 5 is a diagram illustrating a structure of an uplink subframe.

Referring to FIG. 5, an uplink subframe includes a plurality of slots (e.g., 2 slots). A slot may include a different number of SC-FDMA symbols according to a length of CP. A UL subframe may be divided into a control region and a data region in frequency domain. The data region includes PUSCH and can be used for transmitting a data signal such as an audio and the like. The control region includes PUCCH and can be used for transmitting UL control information (UCI). The PUCCH includes an RB pair situated at the both ends of the data region on a frequency axis and hops on a slot boundary.

The PUCCH can be used for transmitting control information such as SR (Scheduling Request), HARQ-ACK and/or CSI (Channel State Information).

New RAT

According to performance requirements for the new RAT, a subframe needs to be newly designed to satisfy low latency. The 3GPP LTE system has been designed in a frame structure having TTI of 1 ms, and a data request latency time for a video application is 10 ms. However, future 5G technology requires data transmission of lower latency due to the introduction of a new application such as real-time control and tactile internet, and aims to provide data latency reduced by 10 times as compared with the related art.

Self-Contained Subframe

Figure 6:
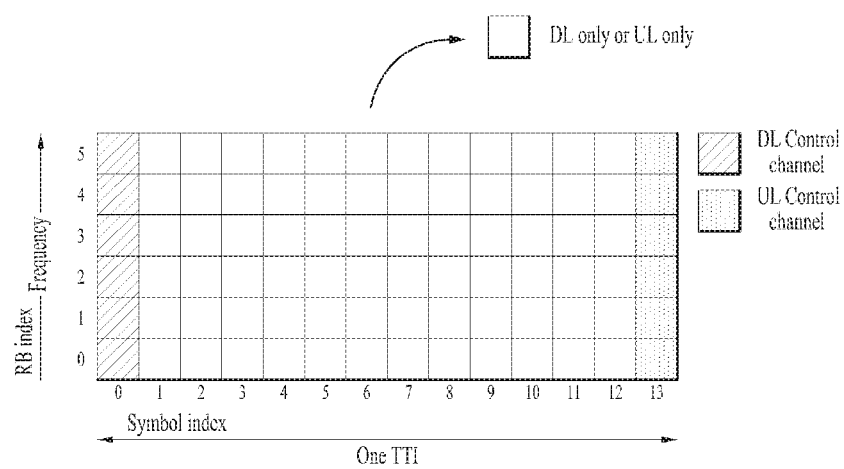
FIG. 6 is a diagram illustrating a structure of a self-contained subframe according to one embodiment of the present invention.

FIG. 6 illustrates a self-contained subframe newly proposed for new RAT (NR)

According to a TDD-based self-contained subframe structure, both a resource region for DL and a resource region for UL (e.g., DL and UL control channels) exist in one subframe.

In FIG. 6, hatched areas indicate downlink control regions and black colored areas indicate uplink control regions. Areas having no mark may be used for downlink data transmission or uplink data transmission.

In this self-contained subframe structure, downlink (DL) transmission and uplink (UL) transmission are performed in due order within one subframe, whereby DL data may be transmitted and UL ACK/NACK may be received within one subframe. Similarly, UL data may be transmitted and DL ACK/NACK may be received within one subframe. As a result, the time required for data re-transmission may be reduced when an error occurs in data transmission, whereby latency of final data transfer may be minimized.

As described above, the expression "Self-Contained" may cover that a response (ACK/NACK) to DL or UL transmitted within the corresponding subframe is received within the corresponding subframe. However, since the time of one subframe or more may be required for transmission and response according to processing performance of the UE/eNB, the self-contained subframe will be defined as a subframe that may self-contain DL control information, DL/UL data and UL control information. That is, UL control information of Self-contained Subframe is not limited to HARQ-ACK information on DL data transmitted at the corresponding subframe.

This self-contained subframe structure requires a time gap that allows a BS and a UE to switch a transmission mode to a reception mode and vice versa. To this end, at least one OFDM symbol on which DL to UL switching is performed is set as a guard period (GP) in the self-contained subframe structure.

Although the self-contained subframe structure shown in FIG. 6 shows that a subframe is configured in the order of DL control region-data region-UL control region, the present invention is not limited thereto. For example, as another self-contained subframe structure, a subframe may be configured in the order of DL control region-UL control region-data region.

Also, for convenience of description, one subframe includes a total of 14 OFDM symbols, and one OFDM symbol is allocated to each of the DL control region and the UL control region. However, one or more OFDM symbols may be allocated to each of the DL control region and the UL control region. Similarly, the number of OFDM symbols included in one subframe may be changed.

Figure 7:
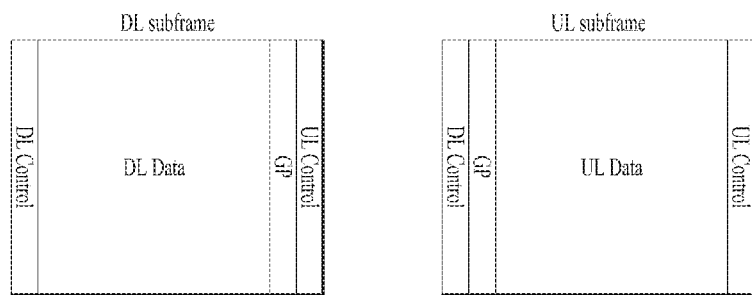
FIG. 7 is a diagram illustrating a downlink self-contained subframe and an uplink self-contained subframe according to one embodiment of the present invention.

FIG. 7 is a diagram illustrating a DL subframe and a UL subframe according to one embodiment of the present invention.

Referring to FIG. 7, the GP is located at the time when DL is switched to UL. For example, the GP is located between the DL data region and the UL control region at the DL subframe and is located between the DL control region and the UL data region at the UL subframe.

The GP may include Tx/Rx switching time of the eNB/UE and a timing advance (TA) for UL transmission of the UE.

Analog Beamforming

Since a wavelength becomes short in the field of Millimeter Wave (mmW), a plurality of antenna elements may be installed in the same area. That is, a wavelength is 1 cm in a band of 30 GHz, and a total of 100 antenna elements of a 2D array may be arranged in a panel of 5 by 5 cm at an interval of 0.5λ(wavelength). Therefore, as a plurality of antenna elements are used, beamforming gain is enhanced, and coverage increase and/or throughput improvement is expected.

In the mmW scheme, if a transceiver unit (TXRU) is provided per antenna element, it is possible to control a transmission power and phase per antenna element, whereby independent beamforming may be performed for each frequency resource. However, a problem occurs in that effectiveness is deteriorated in view of cost when TXRU is independently provided for all of 100 antenna elements.

Therefore, a scheme for mapping a plurality of antenna elements into one TXRU and controlling a beam direction by an analog phase shifter may be considered. However, since this analog beamforming scheme forms beams in only one beam direction with respect to a full band, a problem occurs in that frequency selective beamforming is not available.

As a hybrid type of digital beamforming and analog beamforming, a hybrid beamforming scheme for mapping a total of B TXRUs into a total of Q antenna elements (where, B<Q) may be considered. In this case, although there is a difference depending on a mutual connection scheme of B TXRUs and Q antenna elements, the number of beam directions that enable simultaneous transmission is limited to B or less.

NR Control Channel

In the NR system, a unit forming the basis of transmission of a control channel may be defined as a NR-resource element group (REG) and/or a NR-control channel element (CCE).

While it is assumed in the following description that a control channel is configured with an NR-REG and an NR-CCE for simplicity, a control channel may be configured using only one unit (e.g., NR-CCE). For example, unlike the embodiments described below, the control channel may be configured using only NR-CCEs without NR-REGs. In this case, the NR-REG described in the corresponding embodiment may refer to a constituent (e.g., PRB, OFDM symbol set, etc.) of an NR-CCE. For example, when an NR-CCE is configured on one OFDM symbol and four PRBs, the NR-REG in the corresponding embodiment may correspond to each PRB. As such, the NR-REG may be interpreted as a generic term referring to a smaller unit that constitutes an NR-CCE. The NR-REG/NR-CCE may be referred to simply as an REG/CCE.

An NR-REG may correspond to one OFDM symbol in the time domain and X PRB(s) in the frequency domain. For example, X=1, and 1 PRB may correspond to 12 subcarriers. From the perspective of the UE, when an RS is transmitted within an NR-REG, a control channel may be rate-matched with respect to an RE on which the RS is transmitted.

For example, one REG may correspond to one PRB in the frequency domain and one symbol in the time domain. In addition, 1 CCE may correspond to 6 REGs.

A control resource set (CORESET) and a search space (SS) will be briefly reviewed. A CORESET is a set of resources for control signal transmission, and an SS is a set of control channel candidates on which a UE performs blind detection. The SS may be configured in the CORESET. For example, when one SS is defined in one CORESET, a CORESET for the common search space (CSS) and a CORESET for the UE-specific search space (USS) may be configured. As another example, multiple SSs may be defined in one CORESET. For example, a CSS and a USS may be configured in the same CORESET. In the following examples, a CSS may refer to a CORESET in which the CSS is configured, and a USS may refer to a CORESET in which the USS is configured.

A BS may signal information about the CORESET to a UE. As an example, for each CORESET, a CORESET configuration and a time duration (e.g., 1/2/3 symbols) of the CORESET may be signaled. When interleaving for distributing the CCE over a 1-symbol CORESET is applied, bundling of two or six REGs may be performed. In a 2-symbol CORESET, bundling of 2 or 6 REGs may be performed and time first mapping may be applied. In a 3-symbol CORESET, bundling of 3 or 6 REGs may performed and time first mapping may be applied. When bundling is performed, the UE may assume the same precoding for a corresponding bundling unit.

Figure 8:
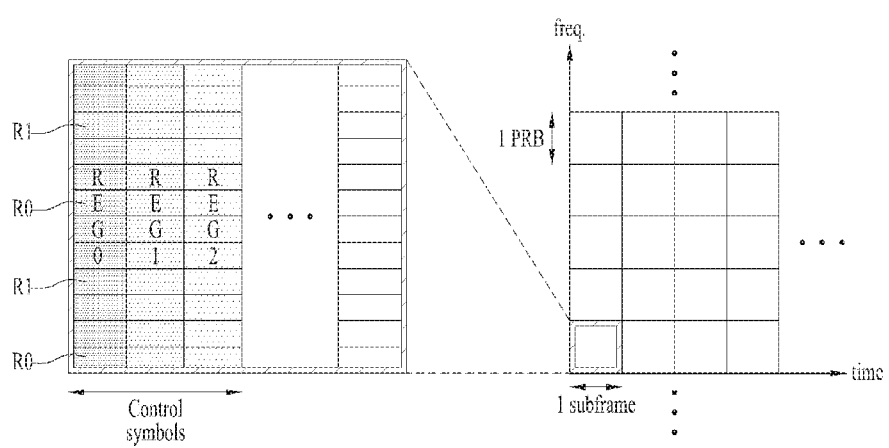
FIG. 8 illustrates an example of an NR-REG according to an embodiment of the present invention.

FIG. 8 illustrates an example of an NR-REG.

While it is illustrated in FIG. 8 that one REG is configured on one control symbol, the number of control symbols corresponding to one REG may be changed. For example, a REG or CCE may be defined as multiple symbols in the time domain.

In addition, while RSs are mapped only on the first control symbol in FIG. 8, other RS configurations may be used. For example, the number of OFDM symbols to which RSs are mapped may increase according to definition of an RS mapping scheme, an NR service type, and/or the number of beams (e.g., analog beams).

The number of REs available for control information transmission (hereinafter, available REs) in the NR-REG may be determined based on an RS configuration and the number of available RE(s) may be differently set per REG. Each REG may include a minimum of 8 REs and a maximum of 12 REs. For example, in FIG. 8, the number of available REs of REG 0 is set to 8 and the number of available REs of each of REG 1 and REG 2 is set to 12.

R0 and R1 represent RSs. Specifically, R0 represents an RS transmitted through antenna port 0 and R1 represents an RS transmitted through antenna port 1.

<NR-CCE Configuration>

According to the definition of the above-described NR-REG, the number of REs constituting each REG may vary with the REG. Therefore, a method of configuring an NR-CCE in such a situation needs to be defined.

According to an example of the present invention, the size of the NR-REG may increase according to the number of control symbols sharing an RS. For convenience of description, an REG including an RS is referred to as an R-REG and an REG that does not include an RS is referred to as a D-REG. As an example, if two RS antenna ports are defined in a control channel and each antenna port carries RSs through two REs per RB, the R-REG may include 8 REs and the D-REG may include 12 REs. Herein, if the number of ports carrying RSs and the number of REs per RB are changed, the number of REs constituting each of the R-REG and the D-REG may differ. An RE in which an RS is transmitted may be referred to as an R-RE and an RE in which control information is transmitted may be referred to as a D-RE. If a structure in which the REG is further extended to more than one symbol in the time domain is considered, the REG may be referred to as a control resource unit instead of the term REG and may be divided into a resource unit in which an RS is transmitted and a resource unit in which an RS is not transmitted. Both the control resource unit and the REG may be used to refer to 12 subcarriers in one OFDM symbol. Hereinbelow, the term REG will be used for convenience.

Example 1

According to an embodiment of the present invention, the NR-CCE may be defined as a fixed number of D-RE(s).

For example, if the NR-CCE is defined as the fixed number of D-REs, the number of NR-REGs may differ according to each control channel candidate even when control channel candidates correspond to the same aggregation level (AL). The control channel candidate may represent a resource unit in which a UE performs blind detection to detect a control channel. If NR-CCE aggregation is allowed, the number of CCE(s) constituting each candidate may be determined according to an AL For example, when it is assumed that one NR-CCE includes 40 D-REs, an AL-1 candidate having one NR-CCE may include no less than 4 REGs (=2 R-REGs+2 D-REGs) and no more than 5 REGs (=5 R-REGs).

According to Example 1, since all NR-CCEs (e.g., all CCEs having the same AL) have the same coding rate with respect to the same information bits, decoding performance of the NR-CCEs may be uniformly maintained and control channel resource configuration of UEs may be simply performed.

However, due to the difference in number of D-REs between the R-REG and the D-REG, a combination of NR-REGs constituting the NR-CCE is limitedly performed. Therefore, flexibility of an NR-CCE configuration is lowered. For example, if the NR-CCE is defined as 40 D-REs as the case in which 3 OFDM symbols are configured as a control region and RSs are transmitted only on the first symbol as illustrated in FIG. 8, there may be a D-REG which is not used for control channel transmission and, therefore, resources may be wasted.

To prevent waste of resources, it is necessary to optimize configurations such as the number of control symbols and the R-REG/D-REG. As an example, if the NR-CCE is configured in one or two symbols with 40 D-REs and the number of control symbols is 2, the NR-CCE may be defined as a combination of two R-REGs and two D-REGs. For example, 4 adjacent R/D-REGs may constitute one NR-CCE.

Example 2

As another example of the present invention, the NR-CCE may be defined as a fixed number of NR-REG(s).

If the NR-CCE is defined as the fixed number of NR-REG(s), the number of D-REs constituting each NR-CCE may be differently set according to a combination of NR-REGs. For example, referring to FIG. 8, the NR-CCE may include a minimum of 32 D-REs (e.g., 4 R-REGs) and a maximum of 44 D-REs (e.g., 1 R-REG+3 D-REGs).

According to Example 2, CCE indexing may be simply performed. If a network is aware of channel information regarding each UE, resources may be more efficiently used. As an example, a BS may transmit control information through a CCE including a relatively small number of D-REs to a UE having a good channel state and transmit control information through a CCE including a relatively large number of D-REs to a UE having a poor channel state.

Alternatively, the BS may improve channel estimation performance by raising the ratio of R-REGs in which an RS is transmitted among NR-REGs constituting the NR-CCE according to a channel environment. However, according to Example 2, since there is a difference in decoding performance according to the NR-CCE, overall performance may be deteriorated in the case of lack of information about a channel state within coverage.

Example 3

As a further example of the present invention, the definition of the NR CCE may be configured by the BS. For example, the network may configure/signal the definition of the NR-CCE in consideration of a wireless channel environment within coverage. The definition of the NR-CCE may be transmitted through a broadcast channel.

Alternatively, the definition of the NR-CCE used in a specific situation may be preconfigured. For example, whether the NR-CCE is defined by Example 1 or Example 2 may be determined according to an REG-to-CCE mapping scheme. As an example, if REG-to-CCE mapping corresponds to time-first mapping, the NR-CCE may be predefined such that Example 1 is used and, if REG-to-CCE mapping corresponds to frequency-first mapping, the NR-CCE may be predefined such that Example 2 is used. For each case, the number of D-REs or the number of D-REGs/R-REGs, constituting the NR-CCE, may be predefined.

Similarly, the REG-to-CCE mapping scheme (e.g., time-first/frequency-first mapping) may be configured by the network or may be predefined.

If the definition of the NR-CCE and/or the REG-to-CCE mapping scheme is configured by the network, such a configuration process is desirably performed prior to demodulation of a control channel. Therefore, the definition of the NR-CCE and/or the REG-to-CCE mapping scheme may be signaled by a broadcast signal/data (e.g., a common signal, a system information block (SIB)/master information block (MIB), etc.), semi-static signaling, or a semi-static channel.

For example, the definition of the NR-CCE and/or the REG-to-CCE mapping scheme may be signaled by an NR-PBCH or a signal/channel corresponding to the NR-PBCH.

As another example, the definition of the NR-CCE and/or the REG-to-CCE mapping scheme, for common control signaling, may be predefined and the definition of the NR-CCE and/or the REG-to-CCE mapping scheme, for UE-specific control signaling, may be signaled through common control signaling.

As another example, REG-to-CCE mapping and/or definition of the NR-CCE, for a search space/CORESET for a fallback operation, may be preconfigured or signaled through a broadcast signal (e.g., PBCH). In the case of a search space/CORESET configured by UE-specific RRC signaling, REG-to-CCE mapping or definition of the NR-CCE may be indicated by configuration of the search space/CORESET.

<NR-REG Configuration>

While it is assumed in the above examples that one NR-REG is one symbol in the time domain, the definition of the NR-REG may be changed according to the number of symbols of a control region in the time domain and/or according to whether the RS is shared.

Figure 9:
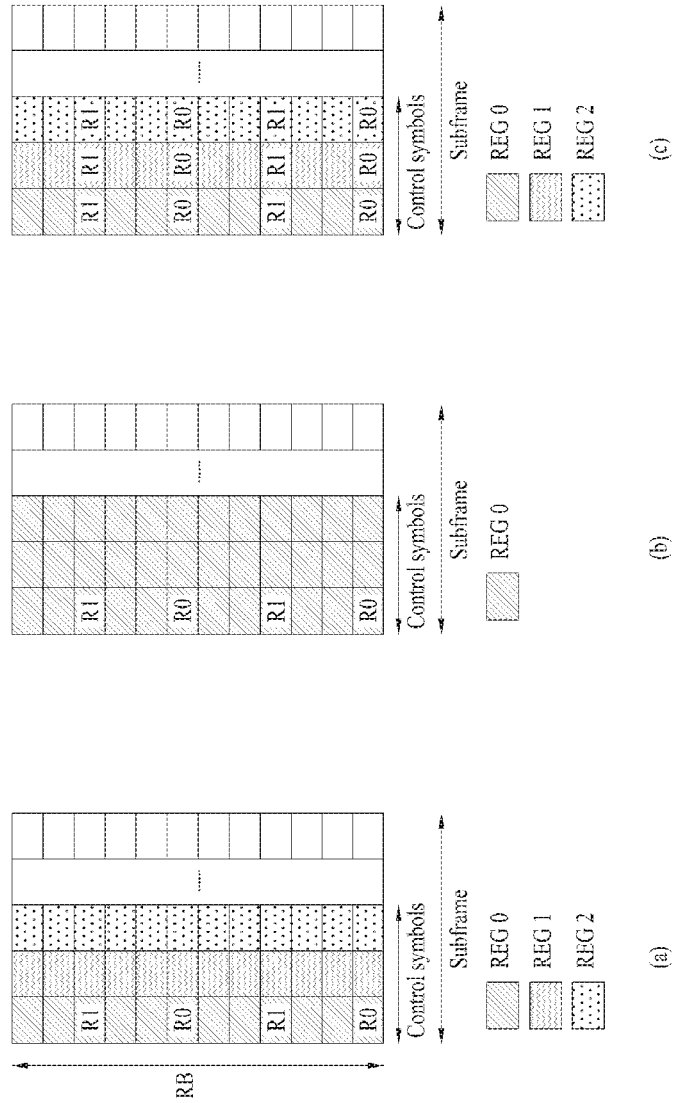
FIG. 9 illustrates REGs according to an embodiment of the present invention.

FIG. 9 illustrates REGs according to an embodiment of the present invention. When a control region includes a plurality of OFDM symbols, the definition of an REG may be selected from among options of FIG. 9. In the following example, the control information may be rate-matched with respect to RE(s) to which RSs are mapped.

In (a) of FIG. 9, the REG is configured in each OFDM symbol of a control region. The configuration of (a) of FIG. 9 may be useful when UEs share RSs in the case in which multiple UEs are multiplexed in the same PRB pair. For example, when it is assumed that control information of UE 1 is transmitted in REG 0 and control information of UE 2 is transmitted in REG 1, RSs of REG 0 may be shared between UE 1 and UE 2. Therefore, UE 2 may demodulate control information transmitted in REG 1 using the RSs of REG 0.

The configuration of (b) of FIG. 9 may be used when it is desired to allocate a control region in a PRB pair to one UE. For example, all control symbols included in one PRB may constitute REG 0 and REG 0 may be allocated to one UE.

In (c) of FIG. 9, the REG is configured in each control symbol and RSs are transmitted in each REG. The configuration of (c) of FIG. 9 may be useful when multiple UEs are multiplexed in a PRB pair but different RSs should be transmitted to each UE (e.g., a transmission scheme such as a beamforming scheme differs according to a UE).

The UE multiplexing and RS sharing scheme illustrated in FIG. 9 are one example of the present invention and other UE multiplexing and RS sharing schemes may be used. For example, all REGs in (c) of FIG. 9 may constitute a CCE of the same UE or a control channel candidate of the same UE. In this case, channel estimation performance may be improved.

The above REG configuration options may be predefined or may be configured by the network. If the REG configuration options are configured by the network, since a configuration for a control channel should be recognized by the UE prior to decoding the control channel, an REG configuration may be indicated by a broadcast signal/channel or a predefined common control channel.

If a different REG is defined per OFDM symbol, the network may signal an REG-to-CCE mapping method to the UE. For example, in (a) of FIG. 9, the network may transmit information indicating that REGs 0, 1, and 2 constitute one CCE or REGs 0, 3, and 6 (not illustrated) constitute one CCE to the UE or predefine the information.

Figure 10:
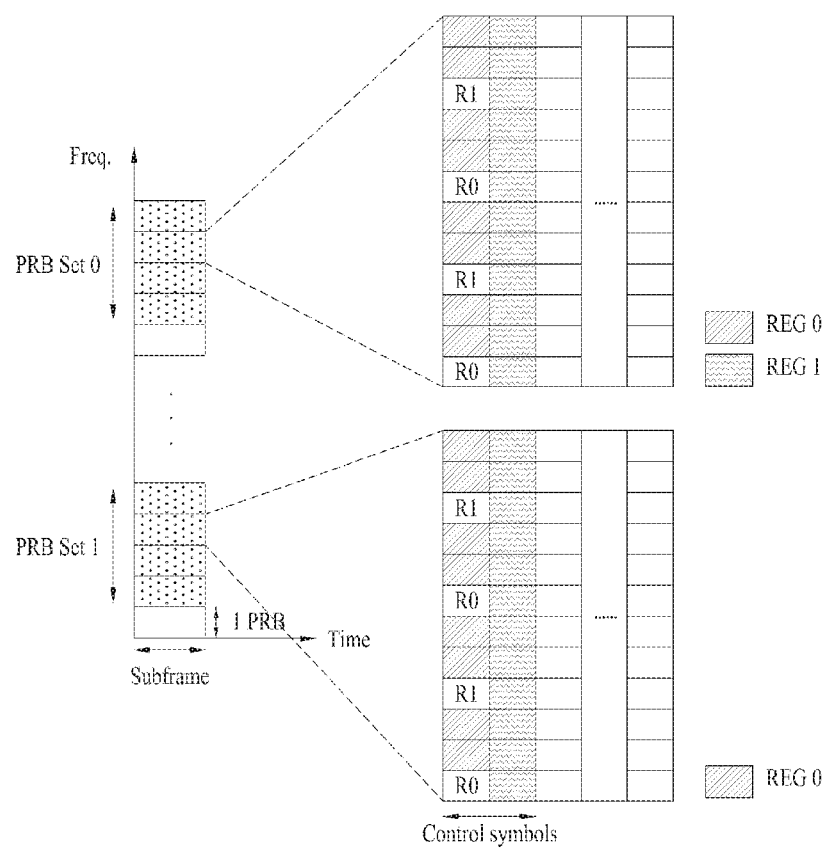
FIG. 10 illustrates an REG configuration indication method according to an embodiment of the present invention.

FIG. 10 illustrates an REG configuration indication method according to an embodiment of the present invention.

A plurality of PRB sets may be configured in the same subframe and a different REG configuration may be applied to each PRB set. For example, the network may inform the UE that a plurality of subframe sets and/or PRB sets per subframe set are configured. The UE may decode a control channel under the assumption that a different REG is configured in each PRB set.

Referring to FIG. 10, in PRB set 0, a different REG is configured in each OFDM symbol. In PRB set 1, control symbols in the same PRB pair are defined as the same REG. An REG configuration per PRB set as illustrated in FIG. 10 may be transmitted through a broadcast signal/channel or a common control channel and information for decoding the broadcast signal/channel or the common control channel may be predefined. Alternatively, when the common control channel is used, the information for decoding the common control channel may be transmitted using the broadcast signal/channel etc. Information for decoding a normal control channel may include all or part of an REG configuration per subframe/PRB set, a CCE mapping scheme per subframe/PRB set, subframe set information, PRB set information per subframe set, a transmission scheme per subframe/PRB set, information as to whether localized/distributed control signaling per subframe/PRB set is performed, and AL related information per subframe/PRB set.

<CCE Size Configuration>

In the NR system, services and transmission options that should be supported may remarkably increases relative to a legacy LTE system. Therefore, a difference in size of a DCI format may increase and it is undesirable to apply the same NR-CCE size to DCI sizes having a large difference.

Accordingly, in an example of the present invention, a different NR-CCE size may be defined per DCI size (or per DCI format or DCI format group). Herein, since definition of different NR-CCE sizes for all DCI sizes may cause increase in complexity, an NR-CCE size which is to be applied to each size duration may be defined based on a DCI size duration. For example, when the smallest and simple DCI is called compact DCI, a UE performing blind decoding for the compact DCI may perform NR-CCE and NR-candidate configurations under the assumption that the size of the NR-CCE is 40 D-REs. In addition, a UE performing blind decoding for DCI defined for a transmission mode such as MIMO may perform NR-CCE and NR-candidate configurations under the assumption that the size of the NR-CCE is 80 D-REs.

An embodiment in which an NR-CCE size varies with each DCI size/format may be performed by varying a starting AL per DCI size/format. For example, a minimum supportable AL per DCI size/format may be differently defined. For the compact DCI, the starting AL may be defined as 1 and, for MIMO related DCI, the starting AL may be defined as 2 or 4. In this case, the number of all blind decoding attempts of each UE may be equally maintained and the number of blind decoding attempts per AL may differ according to the starting AL. A set of ALs that the UE should monitor may be configured and each AL set may be configured per DCI size range or DCI format. Alternatively, an AL set may be configured with respect to each control resource set and the DCI size/format that the UE should monitor in each control resource set may be configured. In addition, the number of REGs per CCE and an REG-to-CCE mapping scheme may be differently configured with respect to each control resource set. Alternatively, an AL set or a starting AL may be differently configured according to a transmission beam of a control channel or a transmission and reception point (TRP).

<Signaling Method>

As described above, the network may configure information for decoding a control channel and each UE may decode the control channel based on the configured information.

Hereinafter, a method in which the BS signals information for control channel decoding to the UE and information included in signaling will be described based on the above-described discussion.

The network may signal the information to the UE using the following methods. A resource unit to which the information transmitted by the following methods is applied may be predefined or may be transmitted in signaling. For example, a plurality of subframes and/or PRB sets may be defined and information for each set may be signaled.

The network may signal the information using a broadcast signal. A broadcasting method may be useful when the information for control channel decoding is cell-commonly or UE-group-commonly applied. The information may be transmitted using a broadcast channel such as a PBCH or using common control signaling. When common control signaling is used, types of information transmitted by a specific identifier (ID) (e.g., radio network temporary identifier (RNTI)) may be distinguished. Alternatively, the BS may transmit the information to a specific UE group using a UE group ID (or a UE group specific RNTI).

The network may forward the information for control channel decoding to each UE using UE-dedicated RRC signaling. A timing at which RRC signaling is applied may be included in the information or may be predefined.

The following information may be transmitted through such a signaling method.

(i) Information about the above-described NR-REG configuration may be transmitted through signaling. The network may command each UE to apply a different NR-REG configuration to each subframe set and/or PRB set.

(ii) RS mapping scheme

An RS mapping scheme may be determined depending on whether an RS is shared. FIG. 11 illustrates RS mapping schemes according to an embodiment of the present invention. (a) of FIG. 11 illustrates a scheme of mapping RSs to the first OFDM symbol of a control region. According to the scheme illustrated in (a) of FIG. 11, three CCEs share the RSs to reduce RS overhead. (b) of FIG. 11 illustrates a scheme of mapping an RS to an REG of the lowest index with respect to each CCE in a corresponding RB. (c) of FIG. 11 illustrates a scheme used when a different precoding scheme is applied to each CCE.

The above RS mapping scheme may be transmitted to each UE using the above-mentioned signaling method. The network may command each UE to apply a different RS mapping scheme to each subframe set and/or PRB set.

As another example, a different transmission scheme may be applied to each PRB set and a transmission scheme specific RS mapping scheme may be predefined. In this case, the UE may decode the control channel under the assumption that an RS mapping scheme determined according to a transmission scheme of each PRB set is used. The present invention is not limited to the RS mapping scheme and may be applied to other information. For example, configuration of other information may be determined by configuration of specific information.

(iii) NR-REG to NR-CCE mapping

Figure 12:
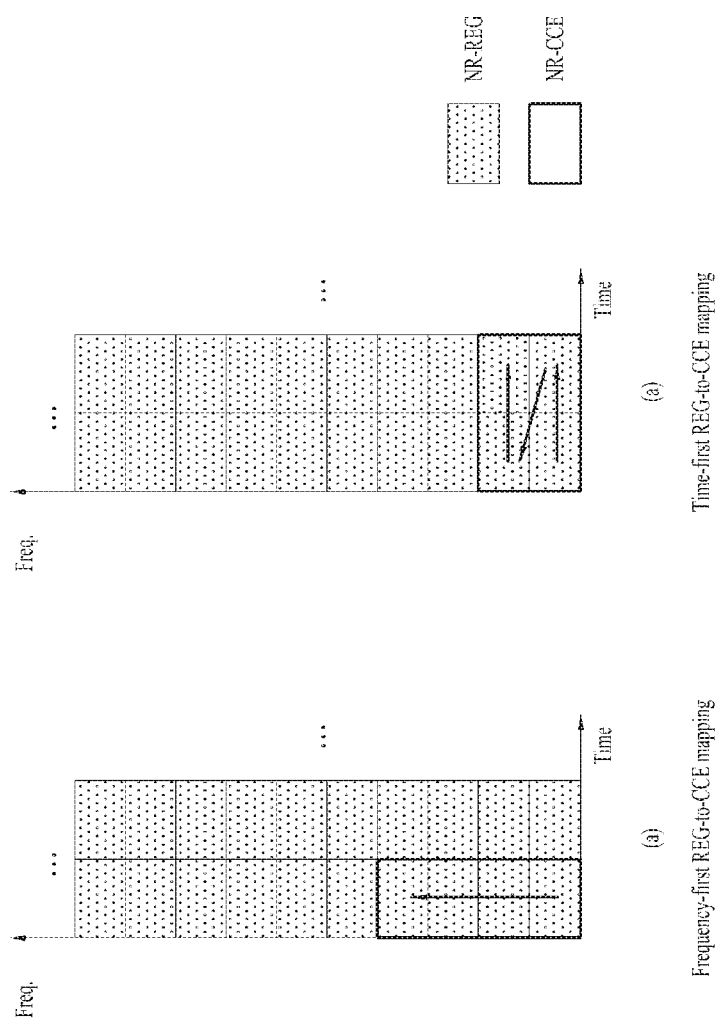
FIG. 12 illustrates REG-to-CCE mapping according to an embodiment of the present invention.

FIG. 12 illustrates REG-to-CCE mapping according to an embodiment of the present invention. (a) of FIG. 12 illustrates frequency-first CCE mapping and (b) of FIG. 12 illustrates time-first CCE mapping.

For example, if a frequency-first mapping scheme as illustrated in (a) of FIG. 12 is used as the case in which an RS is mapped as illustrated in (a) of FIG. 11, channel estimation performance may be improved due to high RS density and frequency diversity gain may be obtained due to spread in the frequency domain. If a time-first mapping scheme is used, since the RS is not transmitted in an NR-REG of the second symbol, a coding rate is lowered and, thus, channel coding gain of a control channel is improved. Therefore, frequency-first mapping may show better performance with respect to a channel having a big variation in the frequency domain and time-first mapping may show better performance with respect to a channel having a flat variation.

The network may configure a plurality of subframe sets and/or PRB sets for each UE and signal an NR-REG to NR-CCE mapping scheme per set.

(iv) Number of control symbols

The network may differently configure the number of OFDM symbols constituting a control region with respect to each subframe set and/or PRB set.

(v) Information related to NR-CCE aggregation

Information related to NR-CCE aggregation may also be subframe-set-specifically and/or PRB-set-specifically signaled.

For example, when a different type of configuration (e.g., localized/distributed configuration and/or time-/frequency-first NR-CCE aggregation configuration) is defined for NR-CCE aggregation, each configuration may be subframe-set-specifically and/or PRB-set-specifically signaled.

Figure 13:
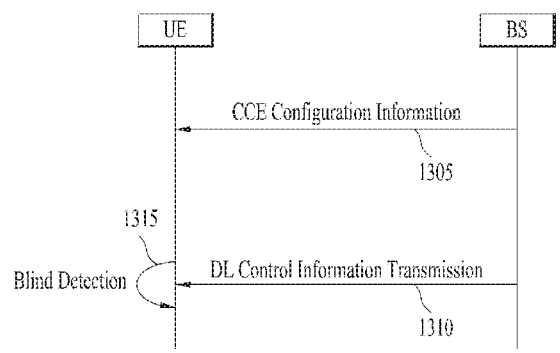
FIG. 13 illustrates a flow of a downlink control information transmission and reception method according to an embodiment of the present invention.

FIG. 13 illustrates a flow of a DL control information transmission and reception method according to an embodiment of the present invention. An overlapping description with the above given description may be omitted herein.

Referring to FIG. 13, a BS may transmit CCE configuration information to a UE (1305).

The BS transmits DL control information through any one of a plurality of control channel candidates each having one, two, or more CCEs to the UE (1310).

The UE obtains the DL control information through blind detection (1315). Specifically, the UE determines the control channel candidates based on the CCE configuration information and blind-detects the DL control information through the determined control channel candidates.

Each of one, two, or more CCEs may include a plurality of REGs. The number of data REs for carrying the DL control information may be independently determined per REG.

The CCE configuration information may indicate whether each CCE has a fixed number of REGs or a fixed number of data REs.

When each CCE has a fixed number of data REs, a first control channel candidate and a second control channel candidate, corresponding to the same AL, may be permitted to have different numbers of REGs. For example, if each CCE includes 40 data REs and an AL is 1, one CCE may correspond to 4 or 5 REGs according to the number of REs for carrying RSs.

When each CCE includes a fixed number of REGs, the number of data REs may be individually determined per CCE.

The number of OFDM symbols corresponding to each REG and the number of RS REs included in each REG may be independently configured per PRB set.

At least one of the size of one CCE and a minimum AL may be determined according to the size of DL control information that the UE desires to detect.

Figure 14:
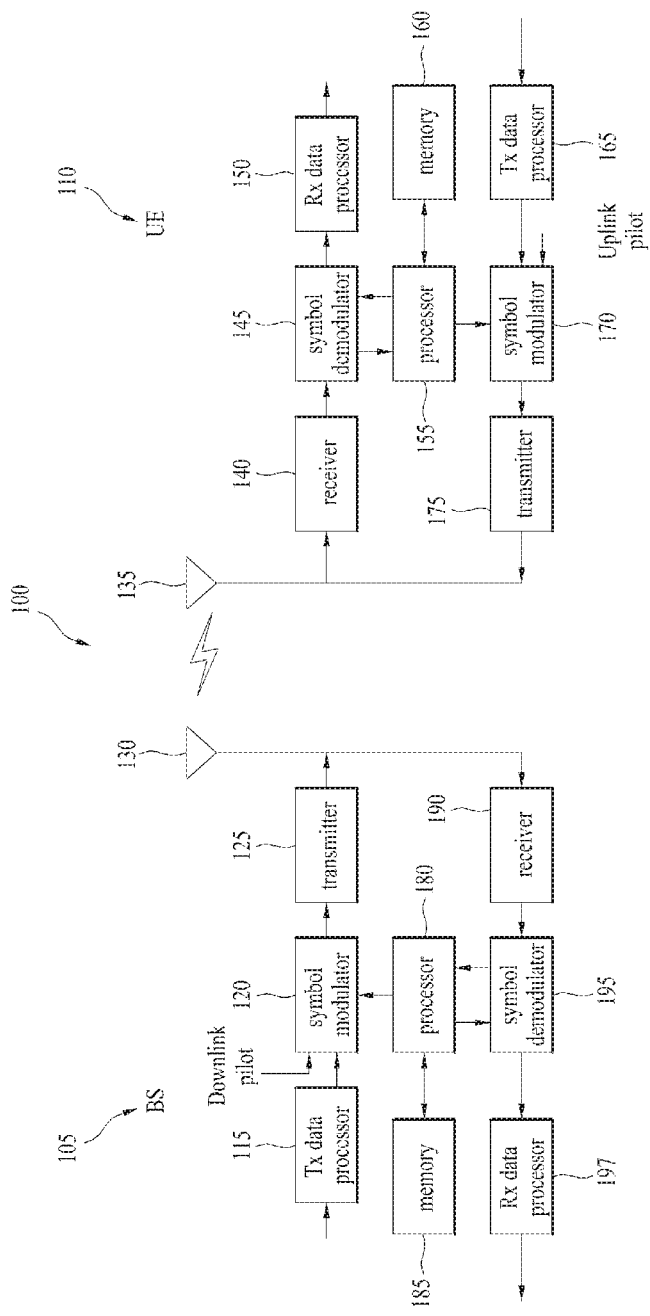
FIG. 14 illustrates a UE and a BS according to an embodiment of the present invention.

FIG. 14 is a block diagram illustrating the configuration of a BS 105 and a UE 110 in a wireless communication system 100 according to an embodiment of the present invention.

While one BS 105 and one UE 110 are shown in the drawing to schematically represent the wireless communication system 100, the wireless communication system 100 may include at least one BS and/or at least one UE.

The BS 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, the UE 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the BS 105/UE 110 are illustrated as including one antenna 130, 135, each of the BS 105 and the UE 110 includes a plurality of antennas. Therefore, each of the BS 105 and the UE 110 of the present invention supports a multiple input multiple output (MIMO) system. And, the BS 105 according to the present invention may support both the single user-MIMO (SU-MIMO) system and the multi user-MIMO (MU-MIMO) system.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In this operation, each of the transmitted symbols may include the data symbol, the pilot symbol or a signal value of zero. In each symbol duration, pilot symbols may be contiguously transmitted. In this operation, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the UE via the antenna 130.

In the configuration of the UE 110, the receiving antenna 135 receives the downlink signal from the BS and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the BS 105, respectively.

In the UE 110 on uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the BS 105 via the antenna 135.

In the BS 105, the uplink signal is received from the UE 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the UE 110.

The processor 155/180 of the UE 110/BS 105 directs operations (e.g., control, adjustment, management, etc.) of the UE 110/BS 105. The processor 155/180 may be connected to the memory unit 160, 185 configured to store program codes and data. The memory 160, 185 is connected to the processor 155, 180 to store operating systems, applications and general files.

The processor 155, 180 may be called one of a controller, a microcontroller, a microprocessor, a microcomputer and the like. And, the processor 155, 180 may be implemented using hardware, firmware, software and/or any combinations thereof. In the implementation by hardware, the processor 155, 180 may be provided with such a device configured to implement the present invention as application specific integrated circuits (ASICs), digital signal processors (DSPs), digital signal processing devices (DSPDs), programmable logic devices (PLDs), field programmable gate arrays (FPGAs), and the like.

In case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155, 180 or stored in the memory 160, 185 so as to be driven by the processor 155, 180.

Layers of a radio protocol between a UE/BS and a wireless communication system (network) may be classified into 1st layer L1, 2nd layer L2 and 3rd layer L3 based on 3 lower layers of open system interconnection (OSI) model well known to communication systems. A physical layer belongs to the 1st layer and provides an information transfer service via a physical channel. Radio resource control (RRC) layer belongs to the 3rd layer and provides control radio resourced between UE and network. A UE and a BS may exchange RRC messages with each other through a wireless communication network and RRC layers.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

As described above, the present invention is applicable to various wireless communication systems.

What is claimed is:

1. A method of receiving downlink control information by a user equipment (UE) in a wireless communication system, the method comprising:
    receiving control channel element (CCE) configuration information from a base station (BS);
    determining a plurality of control channel candidates each including one, two, or more CCEs, based on the CCE configuration information; and
    blind-detecting downlink control information through the plural control channel candidates,
    wherein each of the one, two, or more CCEs includes a plurality of resource element groups (REGs) and the number of resource elements (REs) for carrying the downlink control information is independently determined per REG,
    wherein the CCE configuration information indicates whether each CCE has a fixed number of REGs or a fixed number of data REs, and
    wherein, based on each CCE including the fixed number of data REs, a first control channel candidate and a second control channel candidate, corresponding to the same aggregation level, are permitted to have different numbers of REGs.

2. The method of claim 1, wherein, based on each CCE including 40 data REs and an aggregation level is 1, one CCE corresponds to 4 or 5 REGs according to the number of REs for carrying a reference signal.

3. The method of claim 1, wherein, based on each CCE having the fixed number of REGs, the number of data REs is individually determined per CCE.

4. The method of claim 1, wherein the number of orthogonal frequency division multiplexing (OFDM) symbols corresponding to each REG and the number of reference signal REs included in each REG are independently configured per physical resource block (PRB) set.

5. The method of claim 1, wherein at least one of the size of one CCE and a minimum aggregation level is determined according to the size of the downlink control information that the UE is to detect.

6. A method of transmitting downlink control information by a base station (BS) in a wireless communication system, the method comprising:
    transmitting control channel element (CCE) configuration information to a user equipment (UE); and
    transmitting downlink control information through any one of a plurality of control channel candidates each including one, two, or more CCEs to the UE,
    wherein each of the one, two, or more CCEs includes a plurality of resource element groups (REGs) and the number of resource elements (REs) for carrying the downlink control information is independently determined per REG, and
    wherein the CCE configuration information indicates whether each CCE has a fixed number of REGs or a fixed number of data REs, and
    wherein, based on each CCE including the fixed number of data REs, a first control channel candidate and a second control channel candidate, corresponding to the same aggregation level, are permitted to have different numbers of REGs.

7. The method of claim 6, wherein, based on each CCE including 40 data REs and an aggregation level is 1, one CCE corresponds to 4 or 5 REGs according to the number of REs for carrying a reference signal.

8. The method of claim 6, wherein, based on each CCE having the fixed number of REGs, the number of data REs is individually determined per CCE.

9. The method of claim 6, wherein the number of orthogonal frequency division multiplexing (OFDM) symbols corresponding to each REG and the number of reference signal REs included in each REG are independently configured per physical resource block (PRB) set.

10. The method of claim 6, wherein at least one of the size of one CCE and a minimum aggregation level is determined according to the size of the downlink control information that the BS is to transmit.

11. A user equipment (UE) for receiving downlink control information in a wireless communication system, the UE comprising:
a receiver configured to receive control channel element (CCE) configuration information from a base station (BS); and
a processor configured to determine a plurality of control channel candidates each including one, two, or more CCEs, based on the CCE configuration information, and blind-detect downlink control information through the plural control channel candidates,
wherein each of the one, two, or more CCEs includes a plurality of resource element groups (REGs) and the number of resource elements (REs) for carrying the downlink control information is independently determined per REG,
wherein the CCE configuration information indicates whether each CCE has a fixed number of REGs or a fixed number of data REs, and
wherein, based on each CCE including the fixed number of data REs, a first control channel candidate and a second control channel candidate, corresponding to the same aggregation level, are permitted to have different numbers of REGs.

12. The UE according to claim 11, wherein the UE is capable of communicating with at least one of another UE, a UE related to an autonomous driving vehicle, a base station or a network.

* * * * *